Sept. 12, 1939.  C. O. MARSHALL ET AL  2,172,802
COMPUTING DEVICE
Filed Oct. 7, 1937  4 Sheets-Sheet 1
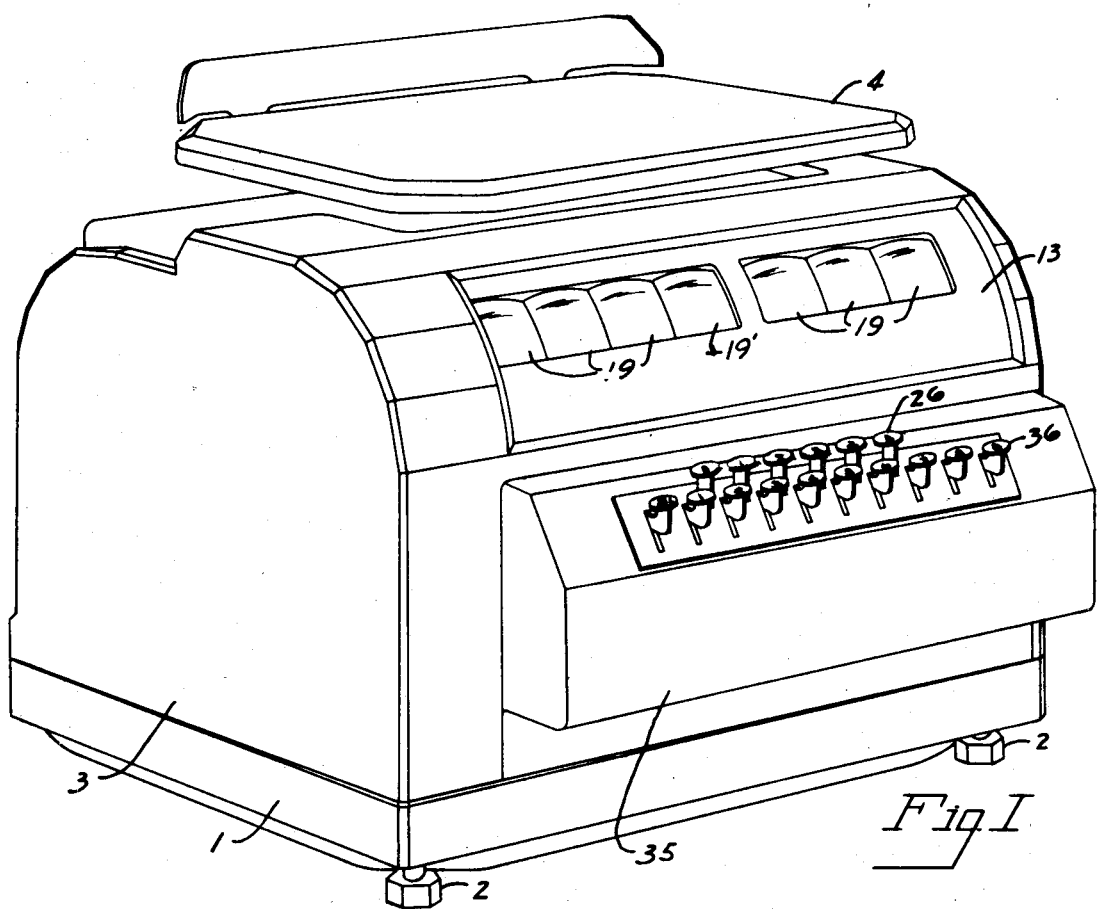
Fig. I
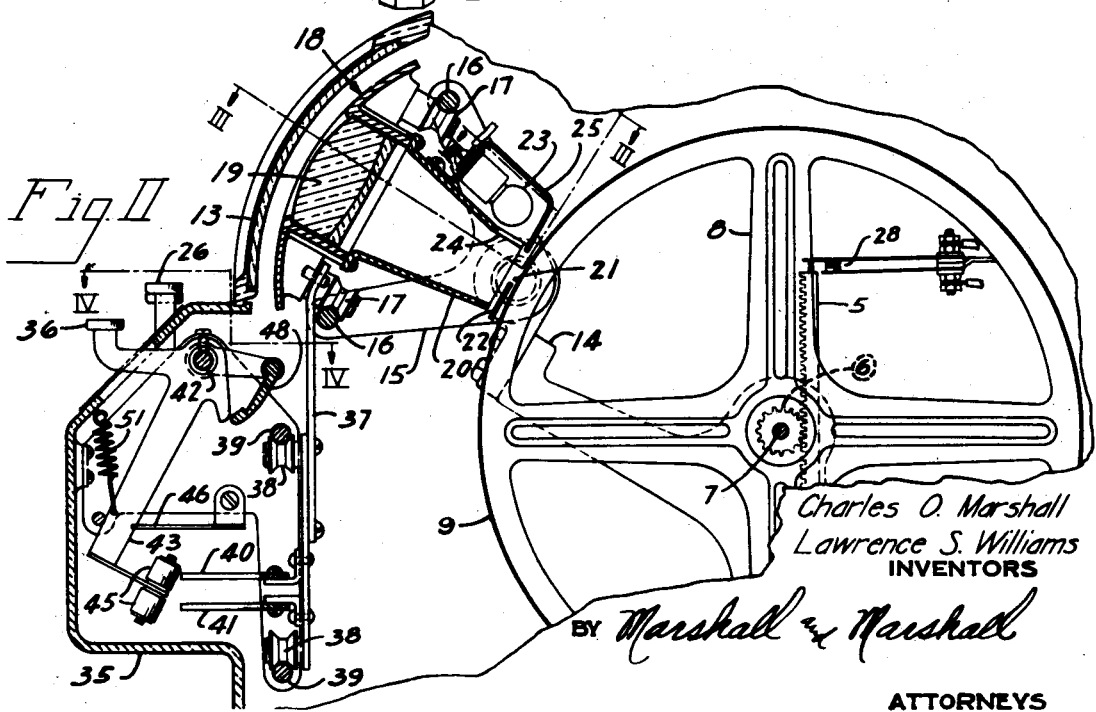
Fig. II
Charles O. Marshall
Lawrence S. Williams
INVENTORS
BY Marshall & Marshall
ATTORNEYS Sept. 12, 1939.   C. O. MARSHALL ET AL   2,172,802
COMPUTING DEVICE
Filed Oct. 7, 1937                4 Sheets-Sheet 2
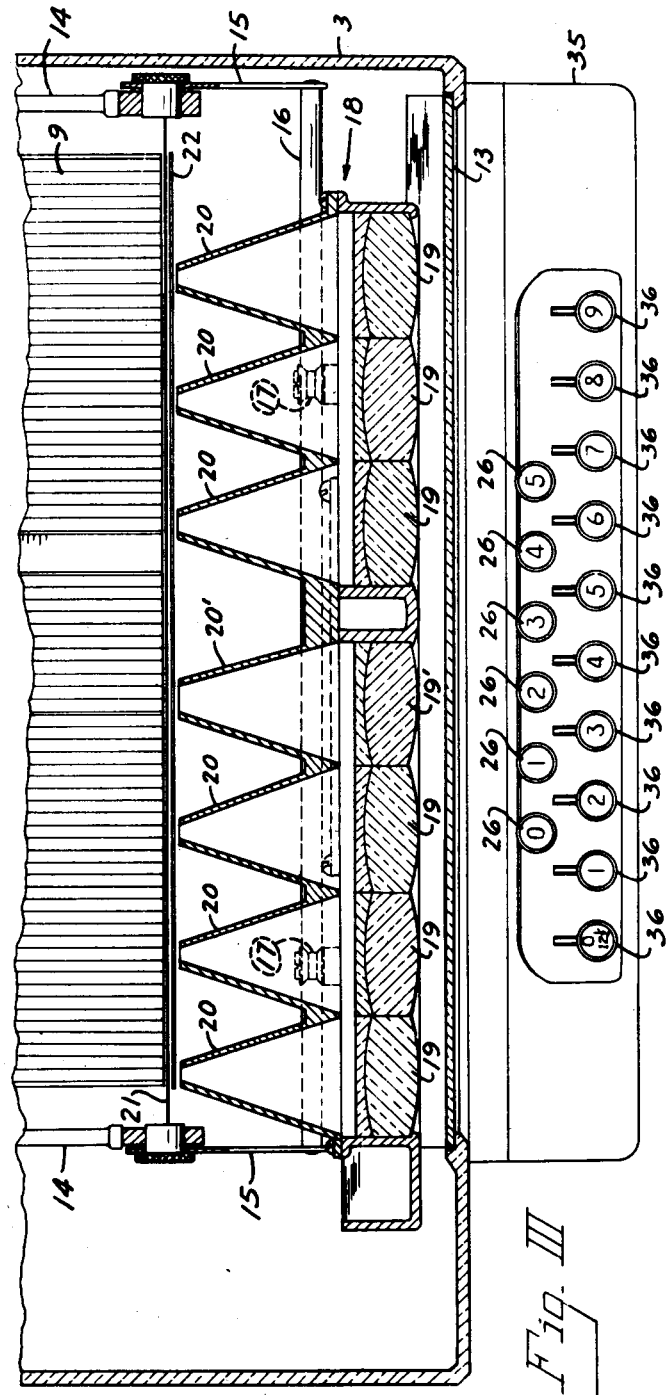
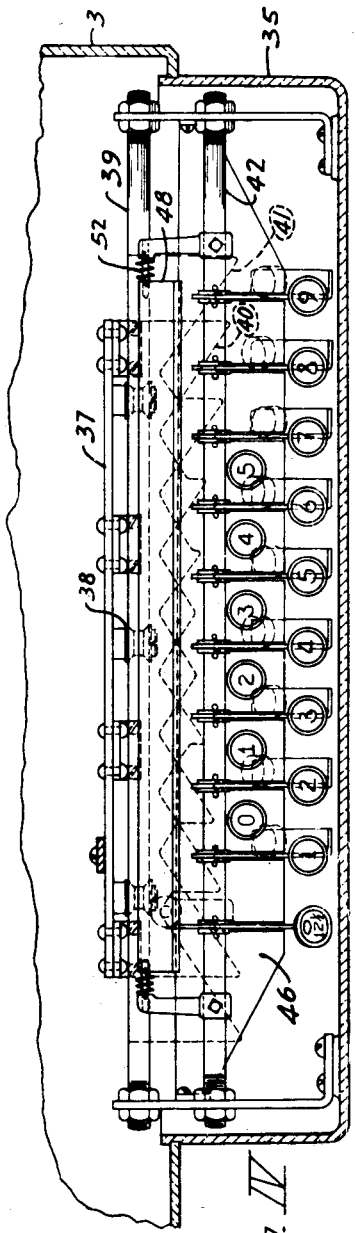
Charles O Marshall
Lawrence S Williams
INVENTORS
BY Marshall & Marshall
ATTORNEYS Sept. 12, 1939.   C. O. MARSHALL ET AL   2,172,802
COMPUTING DEVICE
Filed Oct. 7, 1937   4 Sheets-Sheet 3
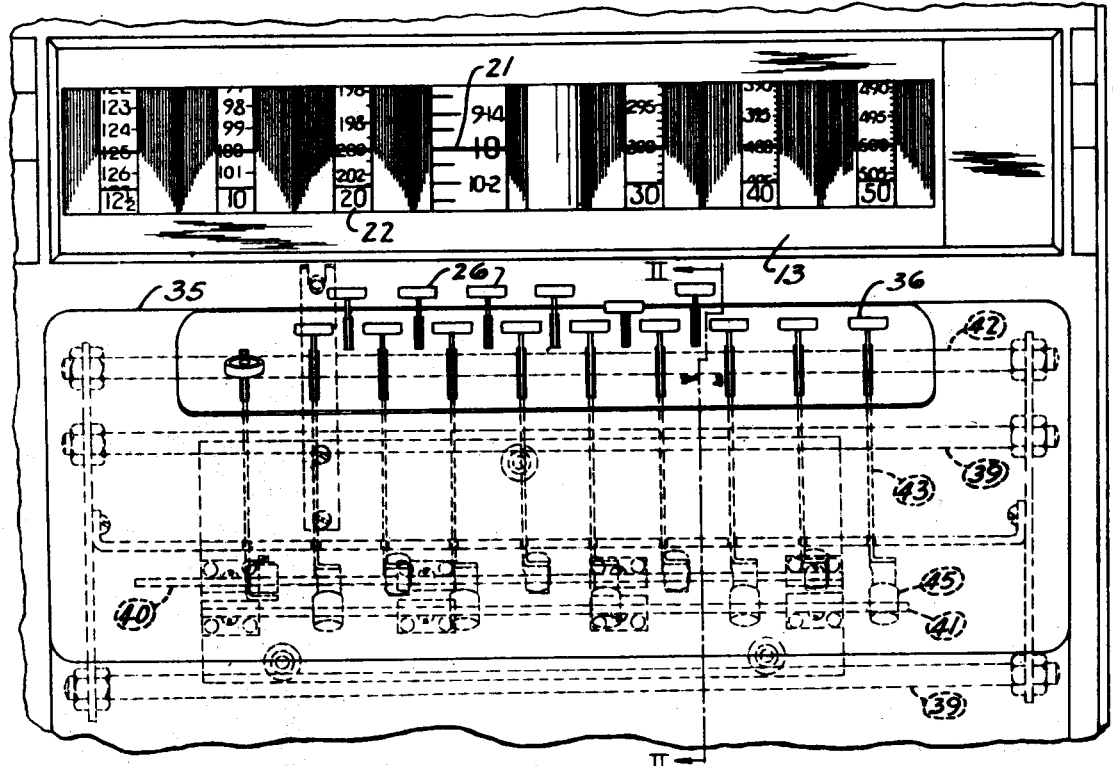
Fig. V
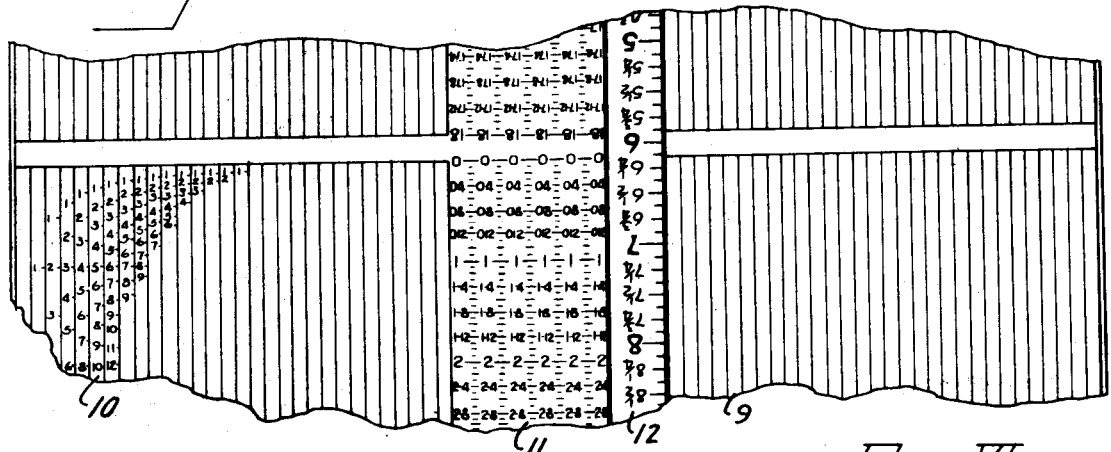
Fig. VI
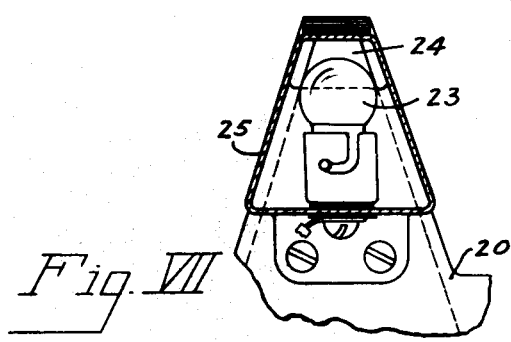
Fig. VII
Charles O. Marshall
Lawrence S. Williams
INVENTORS
BY Marshall & Marshall
ATTORNEYS

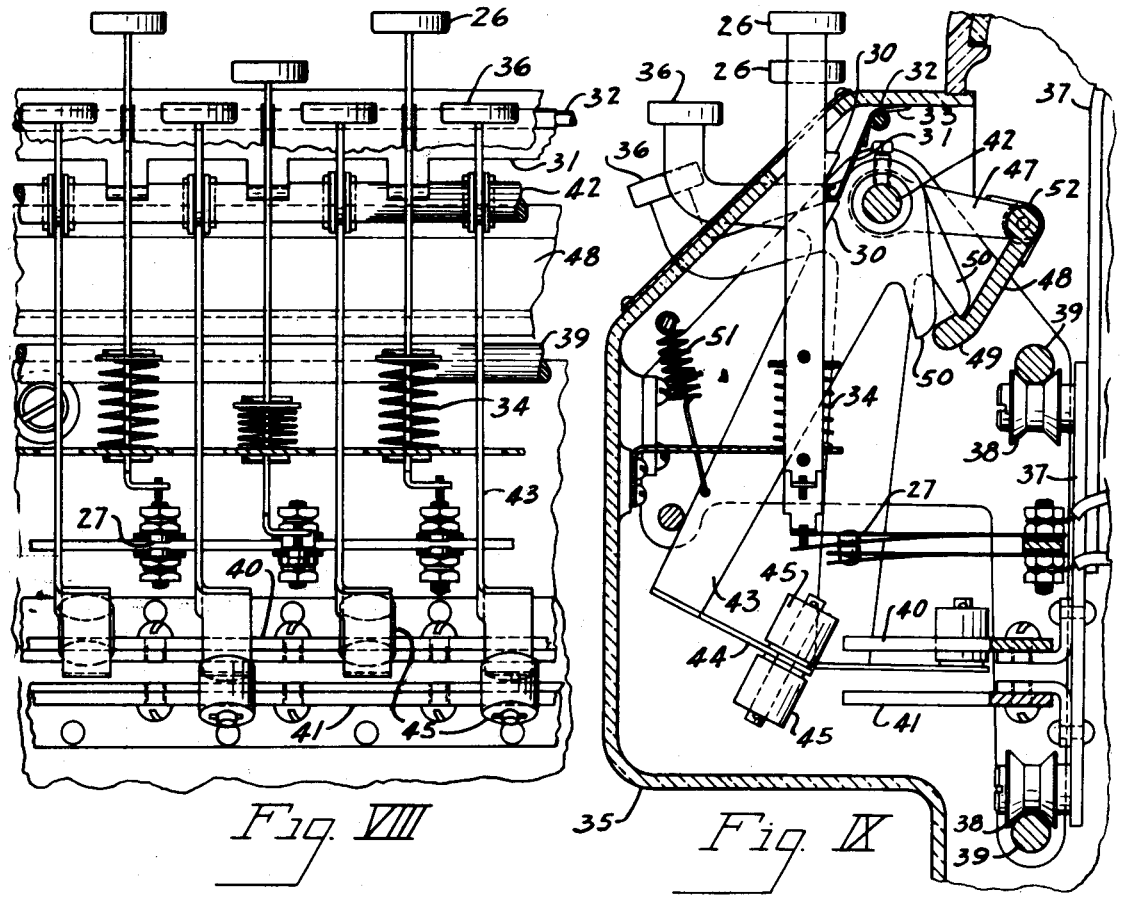

Patented Sept. 12, 1939

2,172,802

UNITED STATES PATENT OFFICE 2,172,802

COMPUTING DEVICE

Charles O. Marshall and Lawrence S. Williams, Toledo, Ohio, assignors to Toledo Scale Manufacturing Company, Toledo, Ohio, a corporation of New Jersey Application October 7, 1937, Serial No. 167,738

12 Claims. (Cl. 235—87)

This invention relates to computing devices, and particularly to devices having computing charts bearing rows or columns of indicia, the indicia of each column representing values which are products of a series of factors, such as weights, multiplied by a selected factor, such as a price per pound. Charts of this kind are commonly used in computing weighing scales.

The principal object of our invention is to provide improved means whereby the indicia of any selected column may be brought into prominence by pressing keys.

Other objects and advantages will be apparent from the following description, in which reference is had to the accompanying drawings illustrating a preferred embodiment of our invention and wherein similar reference numerals designate similar parts throughout the several views.

In the drawings:

Figure I is a view in perspective of a computing weighing scale embodying our invention;

Figure II is an enlarged fragmentary elevational view, with parts in section along the line II—II of Figure V, showing some of the mechanism of the device embodying our invention;

Figure III is a fragmentary plan view, parts being shown in section along the line III—III of Figure II;

Figure IV is a fragmentary plan view, parts being shown in section along the line IV—IV of Figure II;

Figure V is a fragmentary front elevational view showing manipulative keys employed in the device of our invention and computed values uncovered by the manipulation of said keys;

Figure VI is an elevational view of a fragment of a chart employed in the device of our invention;

Figure VII is a fragmentary sectional view, taken along the line VII—VII of Figure II, showing an illuminating device incorporated in the device of our invention;

Figure VIII is an enlarged fragmentary front elevational view showing some of the manipulative mechanism incorporated in the device of our invention;

Figure IX is an enlarged fragmentary side elevational view of the manipulative mechanism illustrated in Figure VIII, parts being shown in section; and Figure X is a wiring diagram showing the electric circuits employed in the device of our invention.

The invention is shown as incorporated in a weighing scale having a base 1 supported by leveling feet 2, the weighing mechanism being housed in a casing 3, above which lies a load-supporting platter 4. The load-supporting platter is connected to load-counterbalancing mechanism (not shown), the load-counterbalancing mechanism being so connected to a rack 5 that when a commodity is placed upon the platter 4, the rack 5 moves lengthwise, turning a pinion 6 which is fixed upon a shaft 7 that carries circular spiders 8. To the peripheries of the spiders 8 is fixed a cylindrical chart 9 bearing encircling columns of computed values 10, a series of identical columns of weight indicating figures and graduations 11, and a reverse column of weight indicating figures and graduations 12. Located in the upper front part of the casing 3 is a window containing a curved sheet of transparent glass 13.

The weighing mechanism of the scale is like that illustrated and described in detail in United States Patent No. 2,066,624 issued Jan. 5, 1937, upon the application of Halvor W. Hem, and, since the present invention is not concerned with the weighing mechanism per se, it is described in this specification only in sufficient detail to show the connection of the present invention therewith.

Fixedly supported upon the base 1 and located within the casing 3 is a frame 14 which supports a rotatable cylindrical chart 9 and which also supports a tiltable frame consisting principally of end brackets 15 and transversely extending rods 16. Supported on the rods 16 by means of rollers 17 is a shiftable viewing device 18 having a series of lenses 19 and a corresponding series of tapered lens cells 20, one of the lens cells 20 being located behind each of the lenses 19. The lens cells are frusto-pyramidal in shape, the areas of their larger ends being substantially co-extensive with the areas of the adjacent lenses, while the widths of their smaller ends are substantially the same as the widths of the individual columns of indicia on the chart 9. Thus, with the viewing device 18 so located that the smaller end of each of the lens cells 20 lies in front of a column of indicia on the chart 9, the indicia of those columns are visible through the lenses, as indicated in Figure V. An index line 21, stretched between the small ends of the lens cells 20 and the surface of the chart 9, shows the operator which indicium to read. Lying along the lower sides of the small ends of the lens cells is a price chart 22, upon which are printed the prices at which the values in the adjacent columns are computed.

The center lens 19' and lens cell 20' are located in front of the identical series of weight figures and graduations 11, and the width of the narrow end of the cell 20' is great enough to encompass a column of figures and an adjacent column of graduations. Hence, regardless of the position of the shiftable viewing device 18, proper weight figures and graduations are visible through the center lens 19'.

While one column of computed values is visible through each of the lenses 19 the adjacent nine columns are hidden. The viewing device 18 may be shifted to bring the position of the narrow ends of each of the lens cells 20 in front of any one of ten columns of computed values. The values of the ten columns at the left side of the chart 9 are computed at the following prices per pound: 12½¢, 1¢, 2¢, 3¢, 4¢, 5¢, 6¢, 7¢, 8¢ and 9¢. The values of the second ten columns from the left side of the chart are computed at prices ranging consecutively from 10¢ to 19¢. The values of the third ten columns from the left side of the chart are computed at prices ranging consecutively from 20¢ to 29¢. The values of the ten columns at the right of the chart 9 are computed at prices ranging from 50¢ to 59¢; the values of the second ten columns from the right of the chart are computed at prices ranging from 40¢ to 49¢, and the values of the third ten columns from the right of the chart are computed at prices ranging from 30¢ to 39¢. The columns visible through the center lens 19' in its various positions are all columns of weight figures and graduations.

When the viewing device is in the position in which it is shown in Figures III and V, the prices 12½¢, 10¢, 20¢, 30¢, 40¢ and 50¢ on the price chart 22 and the corresponding computed values in the columns adjacent those prices are uncovered. If the viewing device were shifted to the right for a distance equal to the width of one column, the prices 1¢, 11¢, 21¢, 31¢, 41¢ and 51¢ on the price chart 22 and the corresponding computed values in the adjacent columns would be uncovered; if it were shifted to the right a distance equal to the width of two columns, prices and computed values at 2¢, 12¢, 22¢, 32¢, 42¢ and 52¢ would be uncovered; if it were shifted five column widths to the right, prices and computed values at 5¢, 15¢, 25¢, 35¢, 45¢ and 55¢ would be uncovered; and if the viewing device were moved to its extreme right-hand position, prices and computed values at 9¢, 19¢, 29¢, 39¢, 49¢ and 59¢ would be uncovered. It will be noted that positioning the viewing device uncovers several series of computations at prices having a common digit. This is an important feature of the invention.

The viewing device illustrated is adapted for use with a chart having computed values at sixty prices per pound. By making the viewing device with fewer or more lenses, it can be adapted for use with charts having computed values at fewer or more prices.

Mounted upon each lens cell and located thereabove in position to illuminate the column of computations and the price visible at the small end of the cell is a lamp 23, an opening 24 being cut in the upper end of each cell to enable light from the lamp to fall upon the adjacent areas of the charts 9 and 22. Each lamp 23 is surrounded by a reflecting shield 25 which increases the illumination of the chart area at the small end of the lens cell upon which the lamp is mounted and prevents light from that lamp from reaching chart areas at the small ends of other lens cells.

Located in front of the casing 3 are two rows of keys, there being one key 26 in the upper row for each lens 19 through which computed values are read; the keys 26 being numbered, from right to left, 0, 1, 2, 3, 4, 5. When one of the keys 26 is pressed, it closes a switch 27 in a circuit arranged to carry current to one of the lamps 23. An automatically operating switch 28 is interposed in a master circuit adapted to carry current not only to a selected one of the lamps 23 but also to lamps 29 and 30 to illuminate one of the columns of weight figures and graduations 11 visible through the center lens 19' and also the column of weight figures and graduations 12 which is visible from the rear side of the weighing scale. When the key 26 at the left side of the row is pressed, the switch in the circuit arranged to supply current to the lamp on the lens cell at the left side of the scale is closed, and if the commodity-platter 4 be loaded, the automatically operating switch 28 will also be closed. Hence, the weight figures and graduations 11 and 12 and also the figures and graduations appearing behind the left lens will be illuminated. Similarly, if the switch closing the key second from the left be pressed, the prices and computed values visible through the lens second from the left will be illuminated. The prices for the values visible through the second lens range from 10¢ to 19¢ and the second key from the left is marked "1". The key controlling the illumination of the values computed at prices ranging from 20¢ to 29¢ is marked "2"; the key controlling the illumination of the values computed at prices ranging from 30¢ to 39¢ is marked "3"; the key controlling the illumination of values computed at prices ranging from 40¢ to 49¢ is marked "4", and the key controlling the illumination of values computed at prices ranging from 50¢ to 59¢ is marked "5".

Fixed upon the stem of each key 26 is a detent 30, which, when the key is depressed, is engaged by a bead on the lower edge of a pawl strip 31 pivoted on a rod 32 and yieldingly held in engagement with the detent 30 by a spring 33. When another key 26 is pressed downwardly, the detent carried by its stem swings the pawl strip 31 out of engagement with the detent fixed to any other key stem and allows that other key to be pushed upwardly by a coil spring 34. Thus, the pressing of any key 26 releases any other previously depressed key 26 and opens the switch which was closed by the previous depression of such other key. This arrangement prevents more than one column of computed values from being illuminated at the same time.

The keys 26 are mounted for vertical sliding movement in framework which is supported by an extension or bay 35 on the front side of the casing 3. The bay 35 also encloses mechanism operated by another row of keys 36 to shift the viewing device 18 from one position to another. Depending from the viewing device 18 is a rigid frame 37 equipped with anti-friction rollers 38 which roll along and are guided by rods 39 fixedly mounted within the casing 3. Fixed to the frame 37 and extending forwardly therefrom is a pair of notched flanges 40 and 41. Each of the keys 36 is pivotally mounted on a fixed shaft 42 and has an integral, downwardly extending leg 43, the lower end of which is bent at right angles to form a foot 44, the toe of which carries a roller 45. The rollers thus connected to the keys 36 are mounted on stud shafts which extend alternately up and down from the feet 44, so that when one of the keys 36 is depressed the roller connected to that key is swung into engagement with the sloping side of a notch in the flange 40 or the flange 41, depending on whether the roller is mounted on an upwardly extending or downwardly extending stud shaft.

As the roller 45 is pressed against the sloping side of the notch, it pushes the frame 37 and the viewing device 18 sidewise in one direction or the other until the roller reaches the V-shaped bottom of the notch. The width of each notch in the flanges 40 and 41 is greater than the maximum distance that the viewing device can be shifted, therefore each roller 45 always enters the same notch. The roller moved by the key marked $$\frac{\text{``0''}}{12\frac{1}{2}}$$

always shifts the viewing device to its extreme left position, i. e., to the position in which it is shown in Figures III and V and in which valves computed at 12½¢ per pound and at 10¢, 20¢, 30¢, 40¢ and 50¢ are uncovered. The roller moved by the key marked "9" always shifts the viewing device to its extreme right position, in which values computed at 9¢, 19¢, 29¢, 39¢, 49¢ and 59¢ are uncovered. In order to prevent the legs 43 from springing sidewise when the rollers are pushed against the inclined sides of the notches, the keys are swung in slots cut in a rigidly mounted plate 46.

Pivoted on rigid brackets 47 is a pawl strip 48, upon the lower edge of which is formed a bead 49 to catch detents 50 integral with the several legs 43. After one of the keys 36 has been depressed and the bead 49 has caught the detent 50 corresponding to the depressed key, the key is held in its depressed position against the tension of a retractile spring 51 until another of the keys 36 subsequently is depressed. When the detent of the subsequently depressed key strikes the bead 49 is swings the pawl strip 48 back against the tension of a spring 52 and releases the previously caught detent 50, permitting the previously depressed key 36 to be returned to its elevated position by its spring 51. When the previously depressed key 36 is returned to its elevated position the roller carried by the foot connected to that key is withdrawn from its notch, thus freeing the viewing device so that the roller connected to the subsequently depressed key can move the viewing device into a new position. After the release of the previously depressed key, continued movement of the subsequently depressed key swings its detent 50 over the bead 49 and the pawl strip 48 swings forward so that the last pressed key 36 will be prevented from returning to its elevated position.

From the foregoing it will be seen that by pressing one of the rows of keys 26, the operator causes the price and value computation behind one of the lenses 19 to be illuminated, while by pressing one of the rows of keys 36 he causes the viewing device to be shifted to a position in which the last digit of the illuminated price corresponds to the marking on the key. If, for example, the operator were to press the key 26 marked "1" and the key 36 marked $$\frac{\text{``0''}}{12\frac{1}{2}}$$

the viewing device would assume the position in which it is shown in Figure V. If the operator were to press the key 26 marked "1" and the key 36 marked "4", the price 14 and the corresponding computed value would be brought into illuminated prominence when a load were placed on the commodity-platter; if he were to press the key 26 marked "3" and the key 36 marked "7", the price 37 and the completed value at 37¢ a pound would be brought into illuminated prominence; if he were to press the key 26 marked "5" and the key 36 marked "2", he would read the illuminated price and computed value at 52¢ a pound; if he were to press the key 26 marked "0" and the key 36 marked "9", he would see the price 9 and the computed value at 9¢ a pound, while if he were to press the key 26 marked "0" and the key 36 marked "12½", the price and computed value at 12½¢ a pound would be illuminated.

If it is desired that all of the uncovered prices and computations be illuminated, the row of keys 26 and their electrical connections may be omitted. The operator then would press one of the keys 36 to position the viewing device and render visible the several series of computations at prices having a common units digit, after which the operator mentally would select the proper price and computation to read.

The printed prices and columns of value indicia may, if desired, be arranged so that the several series of prices uncovered in each position of the viewing device have a common tens digit instead of a common units digit.

The embodiment of our invention herein shown and described is to be regarded as illustrative only, and it is to be understood that the invention is susceptible to variation, modification and change within the spirit and scope of the subjoined claims.

Having described our invention, we claim:

1. In a device of the class described, in combination, a chart bearing series of value computations, means for uncovering several series of computations at prices having a common units digit, said uncovering means including a series of selectively manipulative keys, said manipulative keys each being marked with a digit corresponding to the common units digit of the prices at which the computations uncovered by manipulation of the keys are computed, and means including an additional series of selectively manipulative keys for causing one of said uncovered series to be illuminated, the said additional series of keys being separate and distinct from the first said series of keys.

2. In a device of the class described, in combination, a chart bearing series of value computations, means for uncovering several series of computations at prices having a common digit, said uncovering means including a series of selectively manipulative keys, said manipulative keys each being marked with a digit corresponding to the common digit of the prices at which the computations uncovered by manipulation of the keys are computed, and means including an additional series of selectively manipulative keys for causing one of said uncovered series to be illuminated, the said additional series of keys being separate and distinct from the first said series of keys.

3. In a device of the class described, in combination, a chart bearing series of value computations, means for uncovering several series of computations at prices having a common units digit, said uncovering means including a series of selectively manipulative keys, and means including an additional series of selectively manipulative keys for causing one of said uncovered series to be illuminated, the said additional series of keys being separate and distinct from the first said series of keys.

4. In a device of the class described, in combination, a chart bearing series of value computations, means for uncovering several series of computations at prices having a common digit, said uncovering means including a series of selectively manipulative keys, and means including an additional series of selectively manipulative keys for causing one of said uncovered series to be illuminated, the said additional series of keys being separate and distinct from the first said series of keys.

5. In a device of the class described, in combination, a chart bearing series of value computations, means for uncovering several series of computations at prices having a common units digit, said uncovering means including a series of selectively manipulative keys, said manipulative keys each being marked with a digit corresponding to the common units digit of the prices at which the computations uncovered by manipulation of the keys are computed, and manually selective means separate and distinct from said series of manipulative keys for causing one of said uncovered series to be illuminated.

6. In a device of the class described, in combination, a chart bearing series of value computations, means for uncovering several series of computations at prices having a common digit, said uncovering means including a series of selectively manipulative keys, said manipulative keys each being marked with a digit corresponding to the common digit of the prices at which the computations uncovered by manipulation of the keys are computed, and manually selective means separate and distinct from said series of manipulative keys for causing one of said uncovered series to be illuminated.

7. In a device of the class described, in combination, a chart bearing series of value computations, means for uncovering several series of computations at prices having a common units digit, said uncovering means including a series of selectively manipulative keys, and manually selective means for causing one of said uncovered series to be illuminated, said manually selective means being separate and distinct from said series of selectively manipulative keys.

8. In a device of the class described, in combination, a chart bearing series of value computations, means for uncovering several series of computations at prices having a common digit, said uncovering means including a series of selectively manipulative keys, and manually selective means for causing one of said uncovered series to be illuminated, said manually selective means being separate and distinct from said series of selectively manipulative keys.

9. In a device of the class described, in combination, a chart bearing series of value computations computed at prices having various tens digits, and means for simultaneously uncovering a plurality of spaced computations at prices having a common units digit, the computations so uncovered being in separate series computed at prices having different tens digits, said uncovering means including selectively manipulative keys, said manipulative keys each being marked with a digit corresponding to the common units digit of the prices at which the computations uncovered by manipulation of the keys are computed.

10. In a device of the class described, in combination, a chart bearing series of value computations computed at prices having various tens digits, and means for simultaneously uncovering a plurality of spaced computations at prices having a common digit, the computations so uncovered being in separate series computed at prices having different tens digits, said uncovering means including selectively manipulative keys, said manipulative keys having each been marked with a digit corresponding to the common digit of the prices at which the computations uncovered by manipulation of the keys are computed.

11. In a device of the class described, in combination, a chart bearing series of value computations computed at prices having various tens digits, and means for simultaneously uncovering a plurality of spaced computations at prices having a common units digit, the computations so uncovered being in separate series computed at prices having different tens digits, said uncovering means including selectively manipulative keys.

12. In a device of the class described, in combination, a chart bearing series of value computations, selectively manually operable means for simultaneously uncovering a plurality of spaced series of computations at prices having a common units digit, and selective means separate and distinct from said uncovering means for causing one of said uncovered series to be illuminated.

LAWRENCE S. WILLIAMS.
CHARLES O. MARSHALL.